United States Patent [19]
Westberg et al.

[11] Patent Number: 5,544,631
[45] Date of Patent: *Aug. 13, 1996

[54] CYLINDER HEAD CONSTRUCTION FOR OUTBOARD MOTOR WITH FOUR-STROKE ENGINE

[75] Inventors: Tom Westberg, Gurnee, Ill.; Jeffrey F. Wagner, Shreveport, La.; James C. Kantola; Lawrence E. Zdanowicz, both of Waukegan, Ill.

[73] Assignee: Outboard Marine Corporation, Waukegan, Ill.

[ * ] Notice: The term of this patent shall not extend beyond the expiration date of Pat. No. 5,463,990.

[21] Appl. No.: 318,369

[22] Filed: Oct. 5, 1994

[51] Int. Cl.$^6$ .................................................. F02B 75/18
[52] U.S. Cl. ............................ 123/193.5; 123/196 W; 440/89
[58] Field of Search .................. 123/41.31, 41.82 R, 123/196 W, 195 P, 193.5, 193.3; 440/89; 60/310, 320, 321

[56] References Cited

U.S. PATENT DOCUMENTS

| | | | |
|---|---|---|---|
| 2,003,485 | 6/1935 | Gehres | 123/195 |
| 2,275,634 | 3/1942 | Leipert | 60/29 |
| 2,858,667 | 11/1958 | Reske | 60/31 |
| 3,052,086 | 9/1962 | Kiekhaefer et al. | 60/31 |
| 3,541,786 | 11/1970 | Sarra | 60/30 |
| 3,765,479 | 10/1973 | Fish | 165/51 |
| 3,921,398 | 11/1975 | Kashmerick | 60/310 |
| 4,187,678 | 2/1980 | Herenius | 60/321 |
| 4,214,443 | 7/1980 | Herenius | 60/321 |
| 4,684,351 | 8/1987 | Watanabe et al. | 440/89 |
| 4,711,088 | 12/1987 | Berchem et al. | 60/321 |
| 4,759,181 | 7/1988 | Biritz | 60/321 |
| 4,831,822 | 5/1989 | Yoshimura . | |
| 4,951,465 | 8/1990 | Torigai | 60/323 |
| 4,983,135 | 1/1991 | Boda et al. | 440/88 |
| 4,997,741 | 12/1990 | Lulloff et al. | 60/310 |
| 5,036,804 | 8/1991 | Shibata | 123/41.74 |
| 5,049,100 | 9/1991 | Yamamoto et al. . | |

FOREIGN PATENT DOCUMENTS 60-24847  2/1985  Japan .
60-24845  7/1985  Japan .

*Primary Examiner*—Marguerite McMahon
*Attorney, Agent, or Firm*—Michael, Best & Friedrich

[57] ABSTRACT

Disclosed herein is a cylinder head comprising a one-piece casting including a cylinder block mounting surface adapted to mate with a mounting surface on a cylinder block and including vertically spaced first and second recesses adapted to respectively form portions of first and second combustion chambers and respectively including first and second exhaust ports, a bottom surface extending transversely to the cylinder block mounting surface and including an exhaust gas outlet, and an internal exhaust gas passage extending between the exhaust ports and the exhaust gas outlet.

4 Claims, 2 Drawing Sheets

5,544,631

CYLINDER HEAD CONSTRUCTION FOR OUTBOARD MOTOR WITH FOUR-STROKE ENGINE

BACKGROUND OF THE INVENTION

The invention relates generally to two cylinder, four stroke internal combustion engines and, more particularly, to cylinder head constructions.

Attention is directed to the following U.S. Pat. Nos.:

| | |
|---|---|
| 2,003,485 | Issued June 4, 1935 |
| 2,275,634 | Issued March 10, 1942 |
| 2,858,667 | Issued November 4, 1958 |
| 3,052,806 | Issued September 4, 1962 |
| 3,541,786 | Issued November 24, 1970 |
| 3,765,479 | Issued October 16, 1973 |
| 3,921,398 | Issued November 25, 1975 |
| 4,187,678 | Issued February 12, 1980 |
| 4,214,443 | Issued July 29, 1980 |
| 4,684,351 | Issued August 4, 1987 |
| 4,711,088 | Issued December 8, 1987 |
| 4,759,181 | Issued July 26, 1988 |
| 4,831,822 | Issued May 23, 1989 |
| 4,951,465 | Issued August 28, 1990 |
| 4,977,741 | Issued December 18, 1990 |
| 4,983,135 | Issued January 8, 1991 |
| 5,036,804 | Issued August 6, 1991 |
| 5,049,100 | Issued September 17, 1991 |

Attention is directed to the following Japanese Utility Models:

60-24845

60-24847

RELATED APPLICATION

Attention is directed to U.S. application Ser. No. 318,368 filed Oct. 5, 1994.

SUMMARY OF THE INVENTION

The invention provides a cylinder head comprising a one-piece casting including a cylinder block mounting surface adapted to mate with a mounting surface on a cylinder block and including vertically spaced first and second recesses adapted to respectively form portions of first and second combustion chambers and respectively including first and second exhaust ports, a bottom surface extending transversely to the cylinder block mounting surface and including an exhaust gas outlet, and an internal exhaust gas passage extending between the exhaust ports and the exhaust gas outlet.

The invention also provides a cylinder head comprising a one-piece casting including a cylinder block mounting surface adapted to mate with a mounting surface on a cylinder block and including vertically spaced first and second recesses adapted to respectively form portions of first and second combustion chambers and respectively including first and second exhaust ports, a lower surface extending rearwardly from the cylinder block mounting surface, and a projection extending downwardly from the lower surface and including a bottom surface extending transversely to the cylinder block mounting surface and including an exhaust gas outlet, an internal exhaust gas passage extending between the exhaust ports and the exhaust gas outlet, and an internal water passage extending in heat exchanging relation to the internal exhaust gas passage.

Other features and advantages of the invention will become apparent to those skilled in the art upon review of the following detailed description, claims, and drawings.

Figure 1:
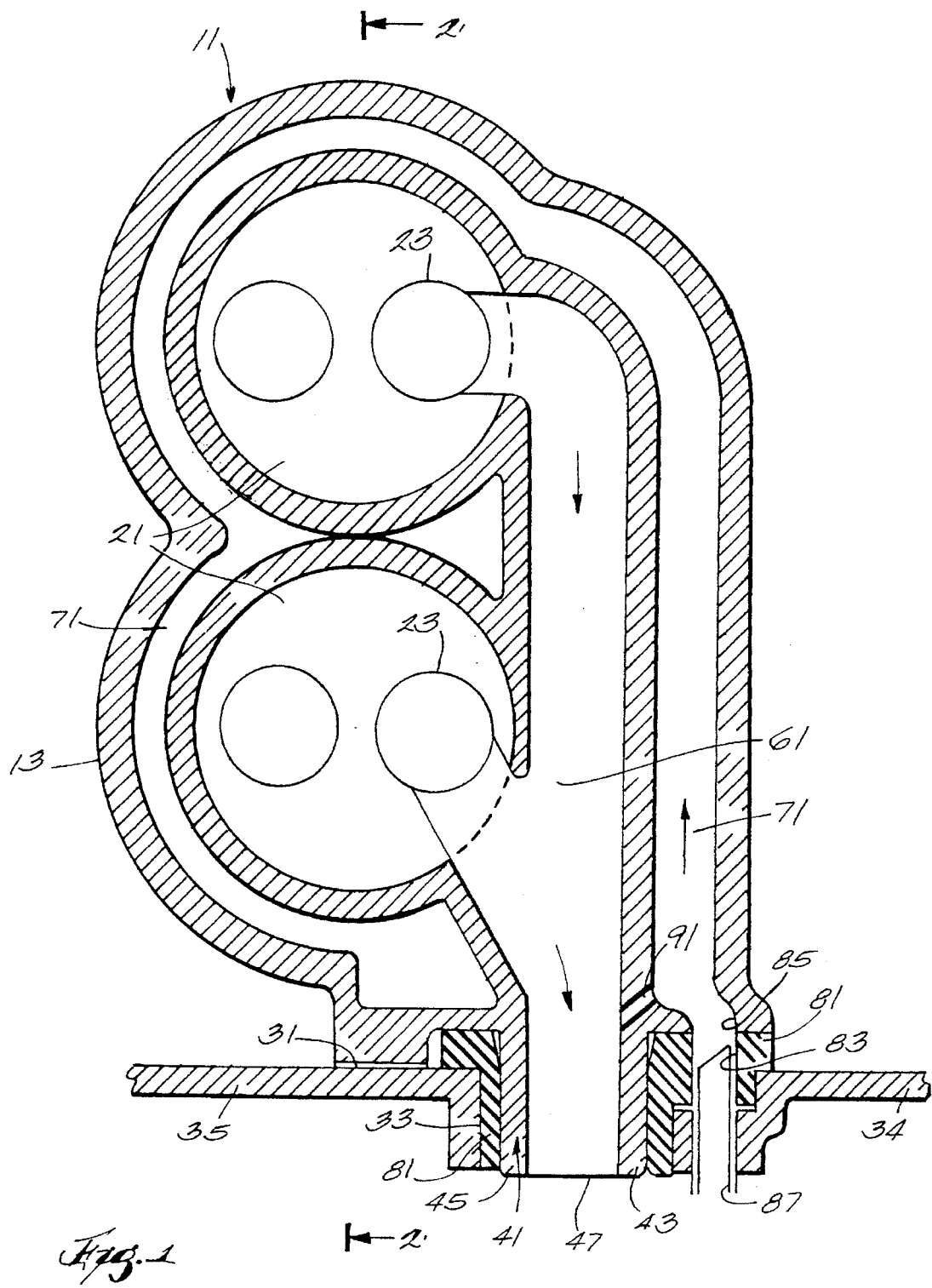
FIG. 1 is a schematic view of a cylinder head construction which embodies various of the features of the invention.
Figure 2:
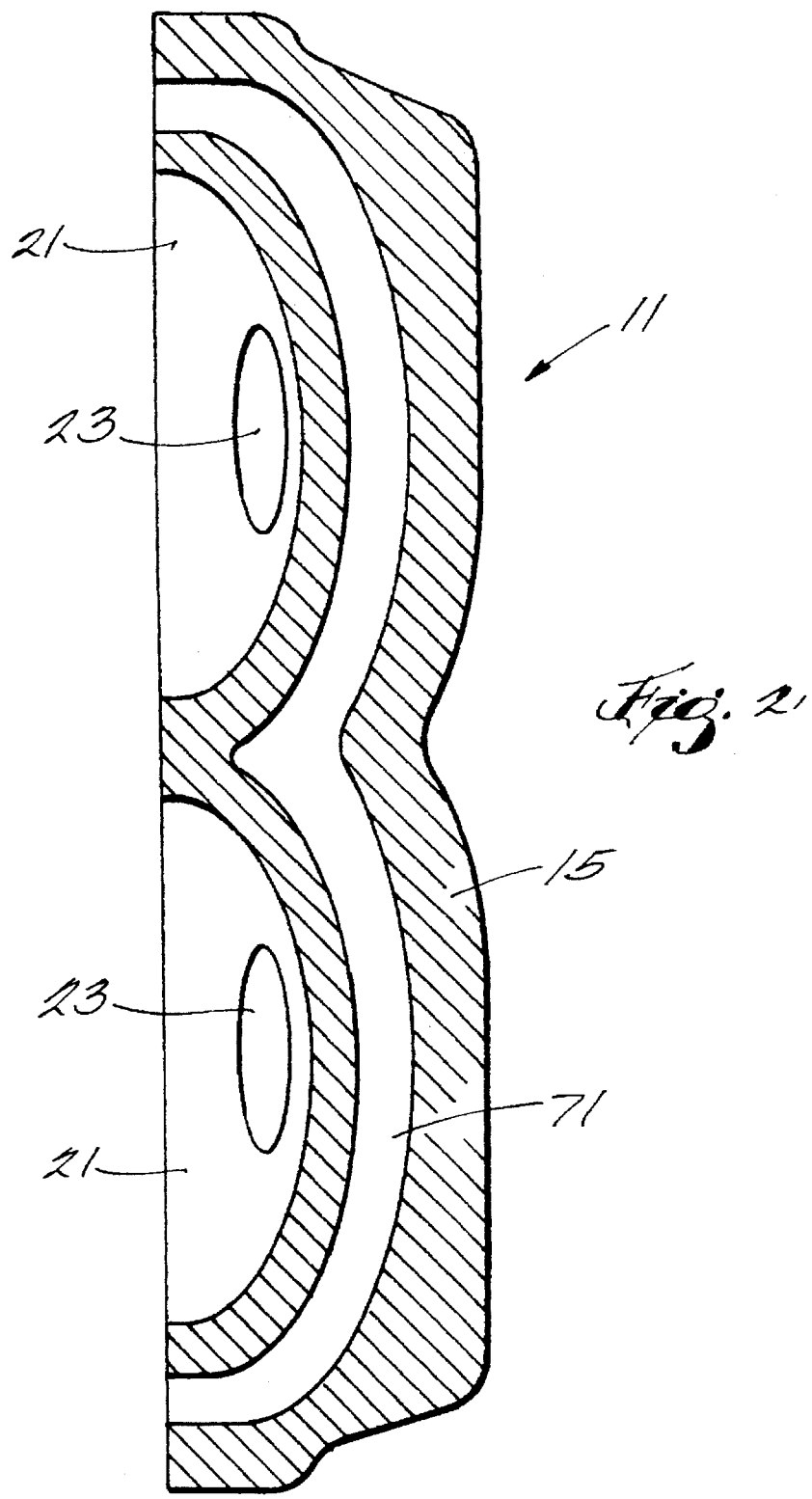
FIG. 2 is a schematic sectional view taken along line 2—2 of FIG. 1.

Before one embodiment of the invention is explained in detail, it is to be understood that the invention is not limited in its application to the details of the construction and the arrangements or components set forth in the following description or illustrated in the drawings. The invention is capable of other embodiments and of being practiced or being carried out in various ways. Also, it is to be understood that phraseology and terminology used herein is for the purpose of description and should not be regarded as limiting.

GENERAL DESCRIPTION

Shown schematically in the drawings is a cylinder head 11 comprising a one-piece casting 13 which is preferably fabricated from aluminum by the lost-foam casting process, and which includes a planar cylinder block mounting surface 15 adapted to be fixed to a cylinder head mounting surface (not shown) of a cylinder block(not shown) and having therein vertically spaced recesses 21 which register with the cylinders (not shown) in the cylinder block and, in general, complete formation of the combustion chambers, and which respectively include therein exhaust ports 23.

The cylinder head 11 also includes a lower surface 31 which extends transversely and rearwardly from the cylinder block mounting surface 15, and a projection 41 which extends downwardly from the lower surface 31 and is adapted to enter into a bore 33 in a generally horizontal wall 34 in the upper part of a fragmentarily illustrated drive shaft housing 35. The projection 41 includes an outer peripheral or endless wall 43 and a lower end or bottom surface 45 having therein an exhaust gas discharge outlet 47 formed, in part, by the endless wall 43.

Internally thereof, the cylinder head 11 includes an exhaust gas passage 61 which extends vertically between the exhaust ports 23 and the exhaust gas discharge outlet 47, and an internal cooling water passage or jacket 71 which extends, at least in part, in heat exchanging relation to the exhaust gas passage 61 and which communicates with a suitable source of cooling water. The cooling water passage or jacket 71 can also extend into adjacent heat exchanging relation to the recesses 21.

Located between the projection 41 and the drive shaft housing is a suitable resilient gasket or grommet 81 which sealingly engages the bore 33 and the outer wall or surface 43 of the projection 41.

The disclosed construction also includes means for supplying cooling water to the cooling jacket or passage 71 in the cylinder head 11. While other constructions can be employed, in the disclosed construction, such means comprises an aperture 83 which is located in the grommet 81 and which communicates with a port 85 located in the cylinder head 11 and communicating with the cooling jacket or passage 71 and which also communicates with a conduit 87 which extends downwardly into the drive shaft housing 35 and which is adapted to be connected to a suitable source (not shown) of cooling water.

In order to further cool the exiting exhaust gases, a small aperture 91 extends in the cylinder head 11 between the cooling jacket or passage 71 and the internal exhaust gas passage 61 in the area near the exhaust gas discharge outlet 47.

Various of the features of the invention are set forth in the following claims.

We claim:

1. A cylinder head comprising a one-piece casting including a cylinder block mounting surface adapted to mate with a mounting surface on a cylinder block and including vertically spaced first and second recesses adapted to respectively form portions of first and second combustion chambers and respectively including first and second exhaust ports, a bottom surface extending transversely to the cylinder block mounting surface and including an exhaust gas outlet, and an internal exhaust gas passage extending between the exhaust ports and the exhaust gas outlet.

2. A cylinder head in accordance with claim 1 wherein the one-piece casting also includes a lower surface extending rearwardly from the cylinder block mounting surface, and a projection extending downwardly from the lower surface and including the bottom surface having therein the exhaust gas outlet.

3. A cylinder head in accordance with claim 1 wherein the one-piece casting also includes an internal water jacket extending in heat exchanging relation to the internal exhaust gas passage.

4. A cylinder head comprising a one-piece casting including a cylinder block mounting surface adapted to mate with a mounting surface on a cylinder block and including vertically spaced first and second recesses adapted to respectively form portions of first and second combustion chambers and respectively including first and second exhaust ports, a lower surface extending rearwardly from the cylinder block mounting surface, a projection extending downwardly from the lower surface and including a bottom surface extending transversely to the cylinder block mounting surface and including an exhaust gas outlet, an internal exhaust gas passage extending between the exhaust ports and the exhaust gas outlet, and an internal water passage extending in heat exchanging relation to the internal exhaust gas passage.

* * * * *